United States Patent [19]

Brown et al.

[11] Patent Number: 5,307,292
[45] Date of Patent: Apr. 26, 1994

[54] METHOD OF QUANTIFYING THE TOPOGRAPHIC STRUCTURE OF A SURFACE

[75] Inventors: Christopher A. Brown, R.R. 2, Box 35, Norwich, Vt. 05055; William A. Johnsen, Parker, Colo.; Patrick D. Charles, Maynard, Mass.

[73] Assignee: Christopher A. Brown, Norwich, Vt.

[21] Appl. No.: 903,355

[22] Filed: Jun. 24, 1992

[51] Int. Cl.$^5$ .................. G01B 21/20; G01B 21/30
[52] U.S. Cl. .................. 364/564; 364/560; 364/578; 356/379; 33/546
[58] Field of Search .......... 364/560, 562, 564, 474.24, 364/578, 577; 356/376, 379; 33/546, 547

[56] References Cited

U.S. PATENT DOCUMENTS 4,912,664  3/1990  Weiss et al. .................. 364/577
5,189,626  2/1993  Colburn ...................... 364/474.24

OTHER PUBLICATIONS

S. Peleg, et al. IEEE Trans on Pattern Analysis and Machine Intelligence-1984-pp. 518-523.
B. B. Mandelbrot-Fractals in Physics-1986-pp. 17-20.
J. W. Martin & D. P. Bentz-Fractal-Based Description of the Roughness of Blasted Steel Panels-1987-pp. 35-41.

*Primary Examiner*—Kevin J. Teska
*Assistant Examiner*—Jae H. Choi
*Attorney, Agent, or Firm*—Blodgett & Blodgett

[57] ABSTRACT

A fractal-based or "patchwork" method for analyzing topographic data simulates covering the surface of a specimen surface with triangular patches in order to determine the relative surface area which is a function of patch size or scale of observation or interaction. The specimen surface has X and Y horizontal axes and a vertical Z axis. Height data is obtained for each point of a grid network of points on the surface, the points being arranged in parallel rows and the rows being spaced. The specimen surface is defined with triangles having a surface area equal to a preselected patch area value. The total area of the planar triangles is calculated to obtain a total measured area of value. The area of the specimen surface in the X-Y plane that is defined by the triangles is calculated to obtain a total measured area value. The total measured area value is divided by the total projected area value to obtain a relative area value. The relative values for several patch area values are plotted to obtain a slope and a threshold, or crossover, point. The threshold is indicative of a point which separates the relatively large scales of observation or interaction which are best described by Euclidean geometry from those smaller ones which are best described by fractal geometry.

14 Claims, 10 Drawing Sheets

METHOD OF QUANTIFYING THE TOPOGRAPHIC STRUCTURE OF A SURFACE

BACKGROUND OF THE INVENTION

The present invention relates generally to a fractal-based method of analyzing topographic data and particularly data which is acquired by the use of electronic profiling, or profilometry, apparatus such as a scanning tunneling microscope (STM), atomic force microscopy (AFM), scanning profilometry, etc. or by stereophotogrametry.

The purpose of the invention is to reduce large topographic data sets and produce parameters that retain the essence of the surface topography for predicting surface behavior and correlating with manufacturing process variables for surface creation.

Interactions with surfaces can be considered to have a characteristic range of sizes or scales over which the interaction takes place. In the case of corrosion or contamination, the characteristic scale would appear to be in the range of atomic sizes, for powder coating it would appear to be the powder size, in the case of machining defects on surfaces on hard aluminum alloys the characteristic size would be the size of the iron rich intermetallic particles in the alloy. To correlate well with behavior or surface creation, the topographic data on which the analysis is based could contain data at the scales characteristic of the interactions; alternatively, fractal analysis could provide means for extrapolating the results of the analysis to finer scales, provided multifractal behavior does not exist in scales over which the extrapolation takes place.

Fractal description of a surface differs from that of which can be provided by Euclidian geometry. Fractal geometry is utilized to describe the random or chaotic nature of the morphologies of surfaces. The area of surfaces, that have a random or chaotic geometric component, is a function of the scale of observation, i.e., the area does not have a unique value but varies with scale.

One method involves sectioning a sample perpendicular to the surface and imaging the resulting profile with scanning electron microscope or optical microscopy. The image is measured so that the profile can be analyzed mathematically. This must be repeated many times to fully characterize a surface. It does not take into account the areas between the profiles and only accounts for the relationship between one profile to adjacent profiles if care is taken in the sectioning.

Stylus profilometry is the most widely used method of gathering topographic data. Profilometry is generally limited to cross sections (i.e., $z=z(x)$) and consists of approximately 5,000 data points after digitalization. It is possible to scan or raster the surface using a profilometer, although scanning is used infrequently. In conventional stylus profilometry the stylus has a radius of 1 to 10 $\mu$m, a finite contact force and is, therefore, insensitive to the fine scales at which many important surface interactions take place. Parameters derived from a box-counting (fractal)analysis of profilometry data have been successfully correlated with cleanability of surfaces contaminated by latex spheres with diameters about ten times smaller than the stylus tip.

STM and AFM produce topographic detail at scales fine enough to include those characteristic of atomic interactions with surfaces. The principle difficulty in dealing with STM and AFM is how to reduce the large sets of topographic points, over 100,000, and retain the qualities of the topography which relate to surface creation and behavior. STM topographic data has been analyzed scan by scan, as if it were profile data. Profile type analyses of STM or AFM data have the advantage of using existing algorithms, although these profile type analyses fail to make use of the information inherently present in the lateral proximity of scans.

Measured surface area of real topographies is a function of the scale of measurement or interaction. There are many topographically dependent phenomena whose intensity depend on the surface area the scale at which they interact with the surface. There is a need for a surface analysis method that can support the systematic and logical design of surfaces, and the processes to create them, a method that can be used to predict the intensity of interactions, e.g., adhesive strength, chemical reactivity, cleanability. This need exists particularly, though not exclusively, on sub-micron scales, where surface topographies of engineering interest tend to have strong random or chaotic components to their geometries, and hence have surface areas that are dependent on the scale of interaction. The topography of the earth's surface has similar properties over certain ranges of scale.

None of the prior art methods determine the relative, or normalized surface areas as a function of an area scale, with a clear physical interpretation. None of the prior art methods use triangles of constant, or substantially similar areas to determine surface areas of topographic data sets as a function of the triangle area. None of the prior art methods deal with design applications.

These and other difficulties experienced with the prior art devices have been obviated in a novel manner by the present Invention.

It is a principal object of the invention to provide a method of providing surface characterizations that are normalized, i.e., don't depend on the actual area which is examined and have clear physical interpretations.

A further object of the invention is to provide a method which is able to distinguish between scale ranges which correspond to smooth and to rough topographies, so that surfaces can be designed that can physically integrate functions which rely on different surface types, without having interferences between the functions.

Another object of the invention is to provide a method of quantifying the topographic structure of a specimen surface from a grid of topographic points by defining the surface in terms of patches which have a predetermined shape and area value to obtain a measured area value and additional measured area values by defining the specimen surface with patches having the same shape and different predetermined area values to provide a plurality of measured area values for analysis of the surface topography of the specimen surface.

A further object of the present invention is the provision of a method of quantifying the topographic structure of a specimen from a grid of topographic data points by defining the surface in terms of patches having a predetermined shape in a manner which enables the data relating to the grid of topographic data points to be stored in the memory of a computer and the surface area calculations in terms of the triangles to be calculated by the computer.

A still further object of the invention is to describe, or characterized, the surface of an object by the way its apparent surface area changes with scale of observation. This description of a surface allows a designer to:
(1) determine the intensity of an interaction (e.g., adhesion, chemical reactivity) with a surface, once the scale of interaction is known by simple multiplication,
(2) determine if it is possible, and if so, how to physically integrate two or more surface related phenomena on one surface while maintaining functional independence, from the scales of interaction of the phenomena, by comparing the scales of interaction to the area of the surface at those scales (or ranges of scales),
(3) design manufacturing processes to create the desired surfaces, for example, by adjusting the scale of interaction of the process with the workpiece material, or by adjusting the constituent size, shape and distribution in a composite workpiece.

With these and other objects in view, as will be apparent to those skilled in the art, the invention resides in the confirmation of parts set forth in the specification and covered by the claims appended hereto.

SUMMARY OF THE INVENTION

The invention consists of a method of quantifying the topographic structure of a specimen surface having a first horizontal dimension parallel to a first horizontal axis (X axis), a second horizontal dimension parallel to a second horizontal axis (Y axis) which is normal to the first horizontal axis and a variable vertical dimension parallel to a vertical axis (Z axis). Height data is obtained for each point of a grid network of points on the specimen surface. The points are arranged in rows which are parallel to the X axis and the rows are spaced along the Y axis. The surface is defined by triangles using the points of the grid as reference points for locating directly or by interpolation vertices of the triangles. Each measure uses triangles that have a predetermined path size or surface area value. A measured area value is obtained by totalling the surface areas of all of the triangles, and a normalized area is found by dividing the measured area value by the projected area value of the specimen in the X-Y plane which is called the relative area and is, in general, specific to that predetermined triangle area.

The patchwork method for analysis of topographic data proposed here is an extension of the Richardson coastline or compass method, classic in fractal analysis. Rather than using line segments with a progression of lengths to approximate the lengths of a profile at different scales, the patchwork method uses triangles with a progression of areas to approximate the areas of a surface. The analysis can lead to a table or plot (often log—log) of apparent surface areas versus scales of observation. Parameters derived from these patchwork plots are believed to be useful; for example, if the scales of the surface interactions are know, then the number of interactions which can occur within a projected, or nominal surface area can be calculated.

When using triangles, fit to topographic data points to characterize the area of a surface, there are three criteria to consider which might be desirable:
(1) keep the area of the triangles constant,
(2) keep the shape of the triangles constant,
(3) completely cover the specimen surface with triangles.

It is not possible, in general, to completely cover a surface exhibiting a random or chaotic character to its topography with triangles of equal area and shape.

In this invention, we relax the complete coverage criterion and account for incomplete coverage by using the projection of the covered area to determine the normalized or relative area. The degree of coverage and the distribution of the area not covered, i.e., always near the edge of the data or distributed throughout, are varied to area triangles that are substantially equilateral (distributed) or are tightly packed (near the edge).

BRIEF DESCRIPTION OF THE DRAWINGS

The character of the invention, however, may be best understood by reference to the accompanying drawings, in which.

DETAILED DESCRIPTION OF THE INVENTION

Figure 1:
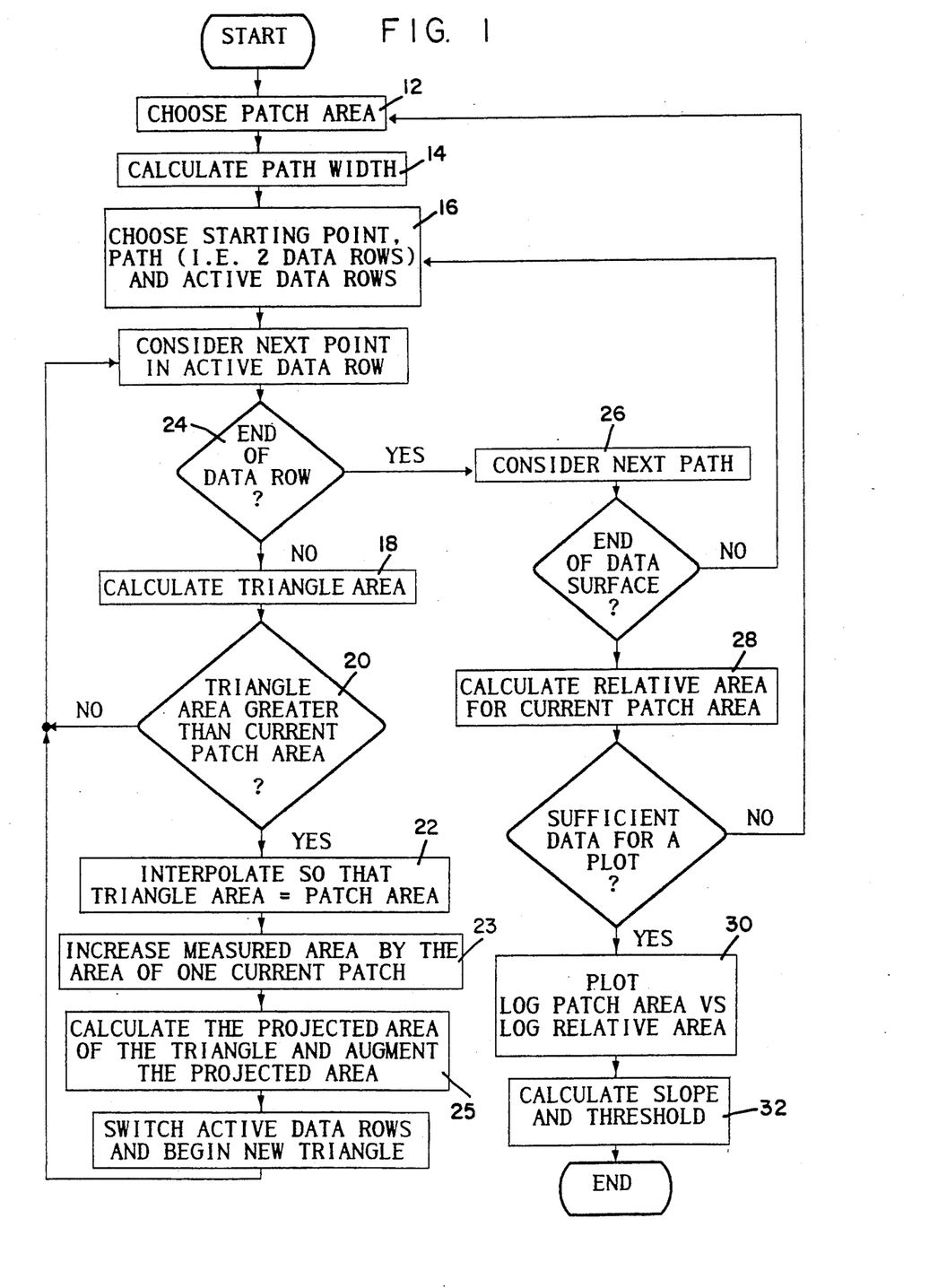
FIG. 1 is a flow chart of the steps of one embodiment of the method of the present invention.

The basic steps of one embodiment of the method of the present invention is shown in FIG. 1. A grid of data points is obtained for a specimen surface by the use of one of several surface measuring systems which are currently available. Stylus profilometry is widely used for relatively large scale surface detail. Scanning tunneling microscopy (STM) and atomic force microscopy (AFM) is used to produce topographic detail at scales fine enough to include those characteristic of atomic interactions with surface Stereophotogrametry can also be used to produce topographic data. The topographic data points form an orthogonal array, with regular spacing in the X and Y directions. The height, Z, of a point on the surface, from an arbitrary datum parallel to the XY plane, is given as a function of position, i.e., $z = z(x,y)$.

The method utilizes a progression of current patch areas, or sizes, $s_i$, which represent the scales of observation. As shown in block 12 of FIG. 1, a particular patch area is chosen to measure the surface area which corresponds to that particular patch area, the specimen surface is defined by constructing triangles with areas as close as possible to the current patch area. A path width is chosen which is consistent with the current patch area as indicated by block 14. The triangles are constructed along paths defined by two rows of topographic data such that the corners of the triangles lie along one or the other of the rows as indicated in block 16. The rows that define the path are separated by the heights, h, of the triangles. The rows defining the path are located at $y=r_j$ and $y=r_j+h$, where the height, h, is the row separation, and $r_j$ is the y position of the row. The data rows alternatively serve as the bases of triangles, such that, triangles k and k+2 have bases that lie on the same row. The sides of adjacent triangles are shared. The third corner of each new triangle, which determines the length of the base of the new triangle and length and orientation of the new side, is found by sequentially considering data points on the base, or active, row. The areas of the resulting triangles are calculated, as indicated in block 18, until the current patch area, $s_i$, is exceeded, as indicated by block 20. An interpolation is done between this last point and the proceeding point such that the triangular patch area matches the current patch area, as indicated by block 22. The measured area is increased by the area of one current patch area as indicated by block 23. A projected area value in the X-Y plane is calculated for each triangle and added to a running total, as indicated by block 25.

If, during the search for the third corner of the new triangle, the data points in the active data row are exhausted before the current patch area is exceeded, then a new path or set of rows at $y=r_j+h$ and $y+r_j+2h$ are considered, see blocks 24 and 26. If the end of the data surface is reached before a new path is defined by locating a new row (i.e., at $y+r_j+2H$) then the total measured area of all triangles with areas equal to the current patch areas, $s_i$, is determined (i.e., number of triangles times the current patch area). The total measured area of the triangles at the current patch area is divided by their total projected area, to determine the relative area, $AR_i$, for that patch area as indicated by block 28. Note that the minimum relative area, found for patch areas which are large compared to the surface features, is one. The entire procedure is repeated for the next patch area in some progression, e.g. logarithmic progression.

When a sufficient number of patch areas have been considered, a log—log plot of relative area, $AR_i$, versus corresponding patch areas $s_i$, is generated as indicated by block 30. A sufficient number of patch areas is that number which allows for the calculation of the desired parameters with the desired accuracy. The extreme on the patch areas are a function of the data set. The maximum patch area is:

$$s_{max}=y_{max}x_{max}/2 \qquad [1],$$

assuming x and y begin at zero. The minimum, meaningful patch area is the square of digitized point spacing divided by two, assuming the point spacing is equal in the X and Y directions (or $x_{min}y_{min}/2$).

Two parameters calculated from the plot are reported here: the threshold (or crossover) and the slope as indicated by block 32. These parameters are calculated in a manner similar to that described previously for analysis of profilometry data by the compass method. In this case, the slope is the slope of the line on the log—log plot found from a linear regression analysis over some specified range of patch area, e.g. two decades of patch area, (below the roughness threshold) for which some criteria is met, e.g. the slope is the greatest or the linear regression coefficient is greatest. The roughness threshold is the largest scale, i.e., patch area, for which the relative area exceeds a selected value. In this case, as in the coastline method, the threshold is arbitrarily chosen as the area of the largest patch, $s_{th}$ where the relative area exceeds 1 plus 10% of the maximum relative area minus one:

$$AR_{th}=1=0.1(AR_{max}-1) \qquad [2].$$

The maximum relative area, $AR_{max}$, is calculated by adding the areas of the triangles formed by adjacent data points, e.g., $x_k$, $x_{k+1}$, and $y_k$, and dividing by the total projected area, i.e., $y_{max}x_{max}$. Note that log ($AR_{max}$) is not plotted, because the patch area (triangle area) is not constant, although the projected triangle area is.

Note that it may not be possible to characterize the log—log plot with a threshold and a slope. The data may not be taken on a fine enough scale to reach the threshold scale. The surface, and its topographic data, may be such that there is no linear portion on the log—log plot, or there may be several (multi-fractals). In either, or both cases, there is still useful information about the surface topography resulting from the analysis.

The patch work method of the present invention is illustrated using STM data taken by a Nanoscope II from a surface of polished steel. The scan area is 1000×1000 nm and contains 160,000 topographic points in a 400×400 array. To facilitate computation, the data is divided into 16 sections, each contains 10,000 points in 100×100 arrays, 250×250 nm.

Figure 2:
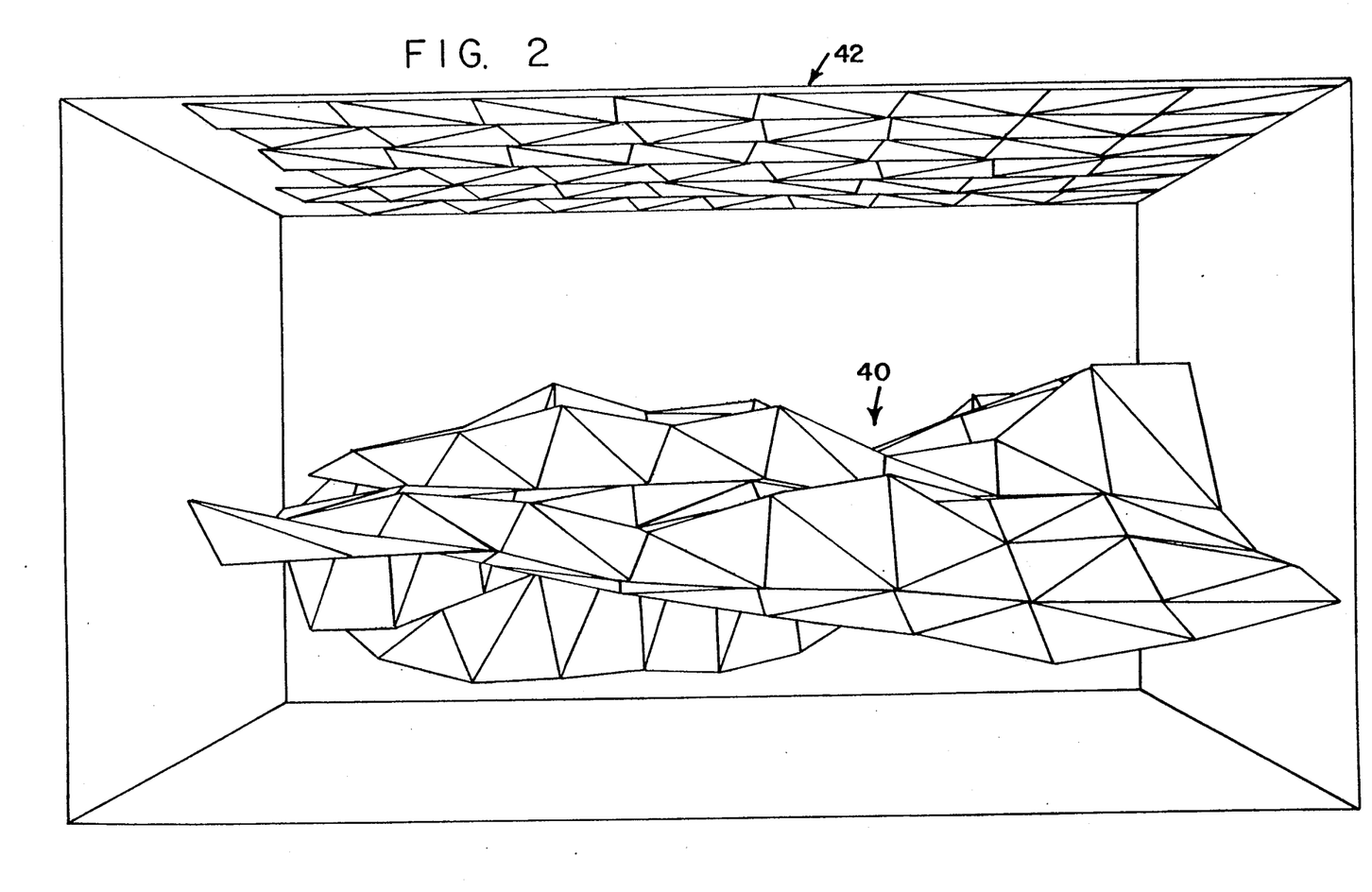
FIG. 2 is a three-dimensional representation of a specimen surface which is defined by triangles of a first patch area.
Figure 3:
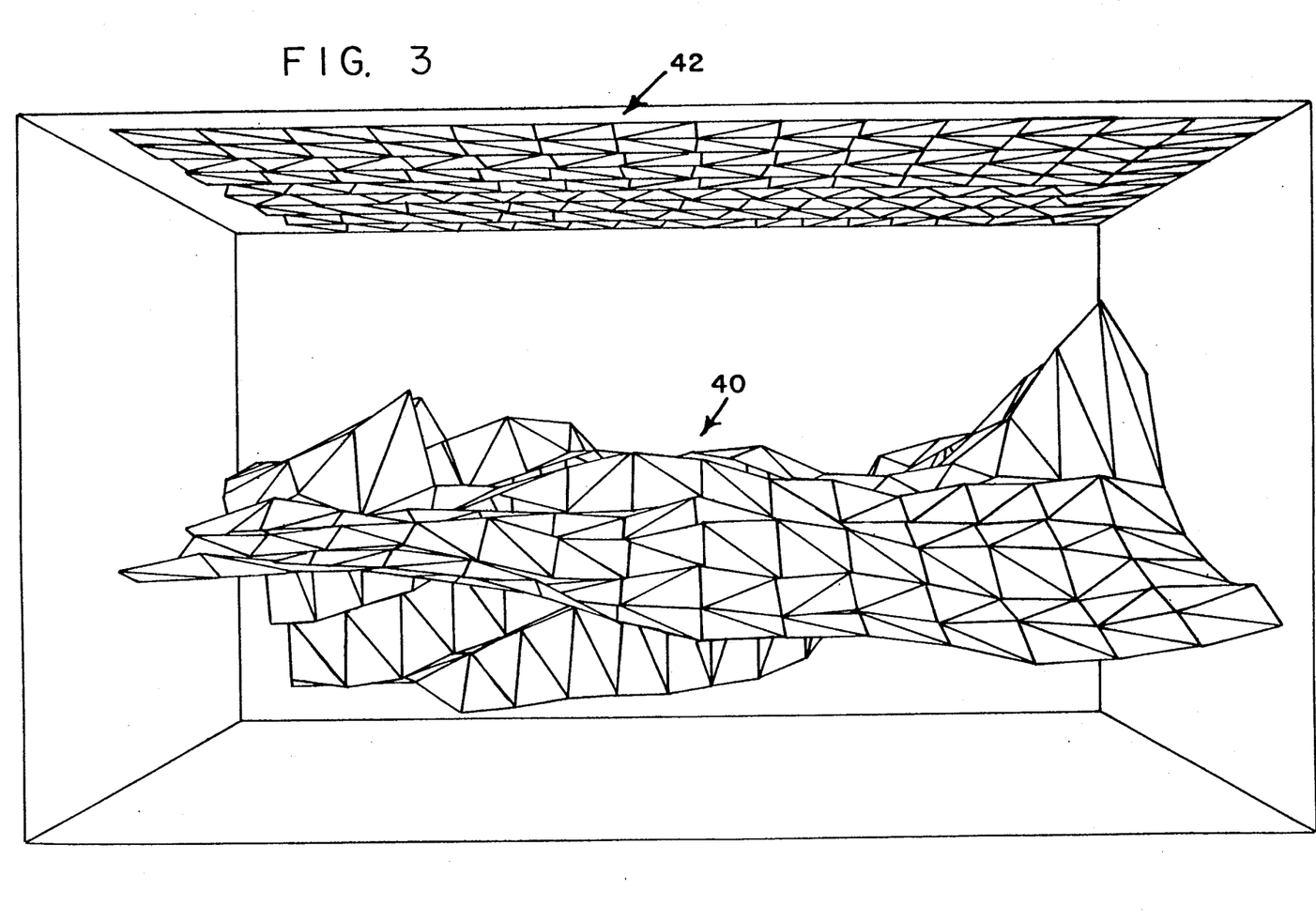
FIG. 3 is a view similar to FIG. 2 for a second patch area.
Figure 4:
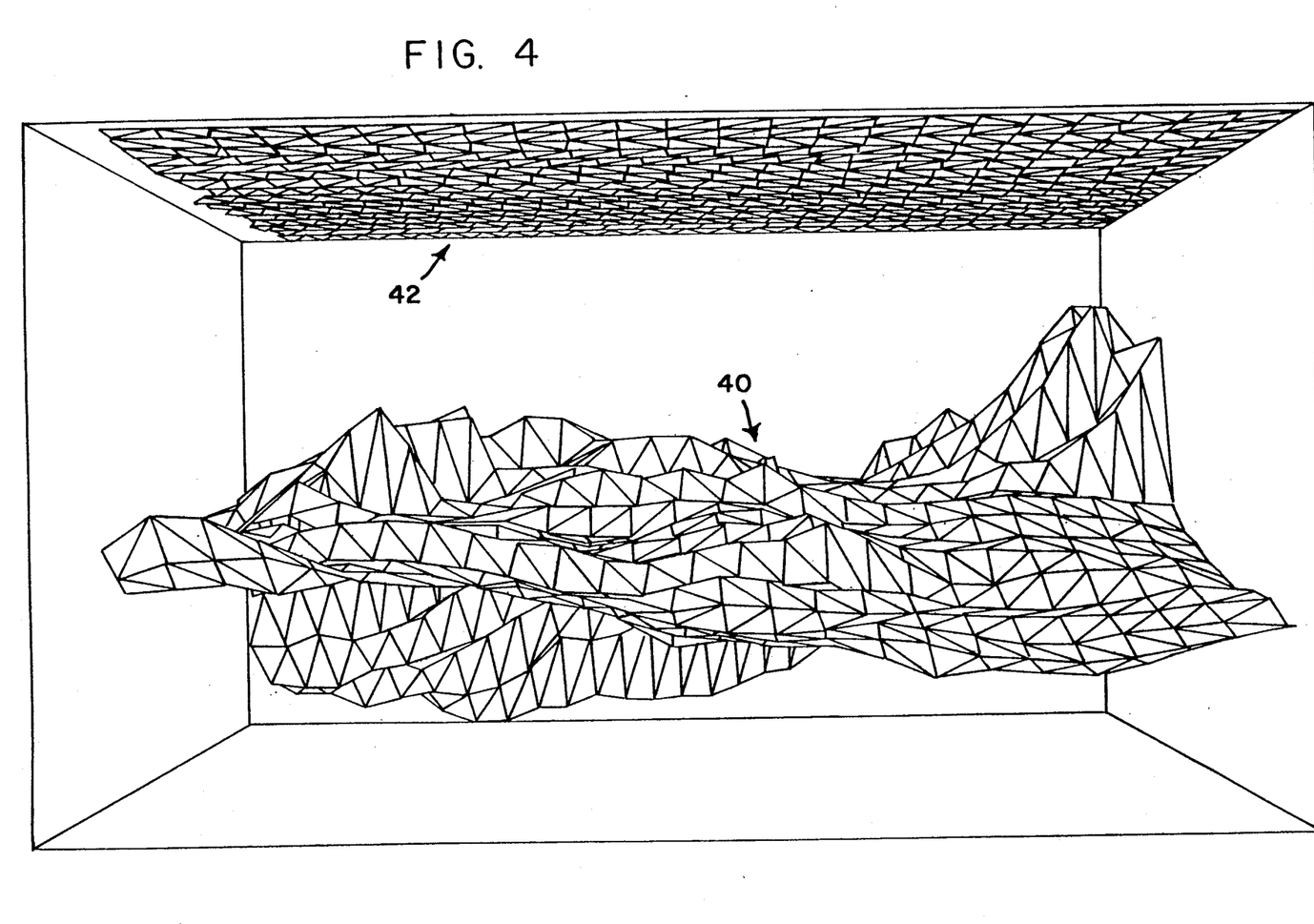
FIG. 4 is a view similar to FIG. 2 for a third patch area.

Plots of one 250×250 nm sections of a similar surface, represented using three different patch areas, are shown in FIGS. 2–4. For clarity in the plots, a larger magnification has been used in the vertical (Z) direction than that in the horizontal (X,Y) directions. This causes the triangles to appear distorted. Equal magnifications in all directions were used for the calculations of relative area. For each figure, the region which is generally indicated by the reference numeral 40 is a perspective or three-dimensional representation of the triangles as applied to the specimen surface. The region which is generally indicated by the reference numeral 42 is a two-dimensional representation of the triangles as viewed in X-Y plane and represents the projected area.

Figure 5:
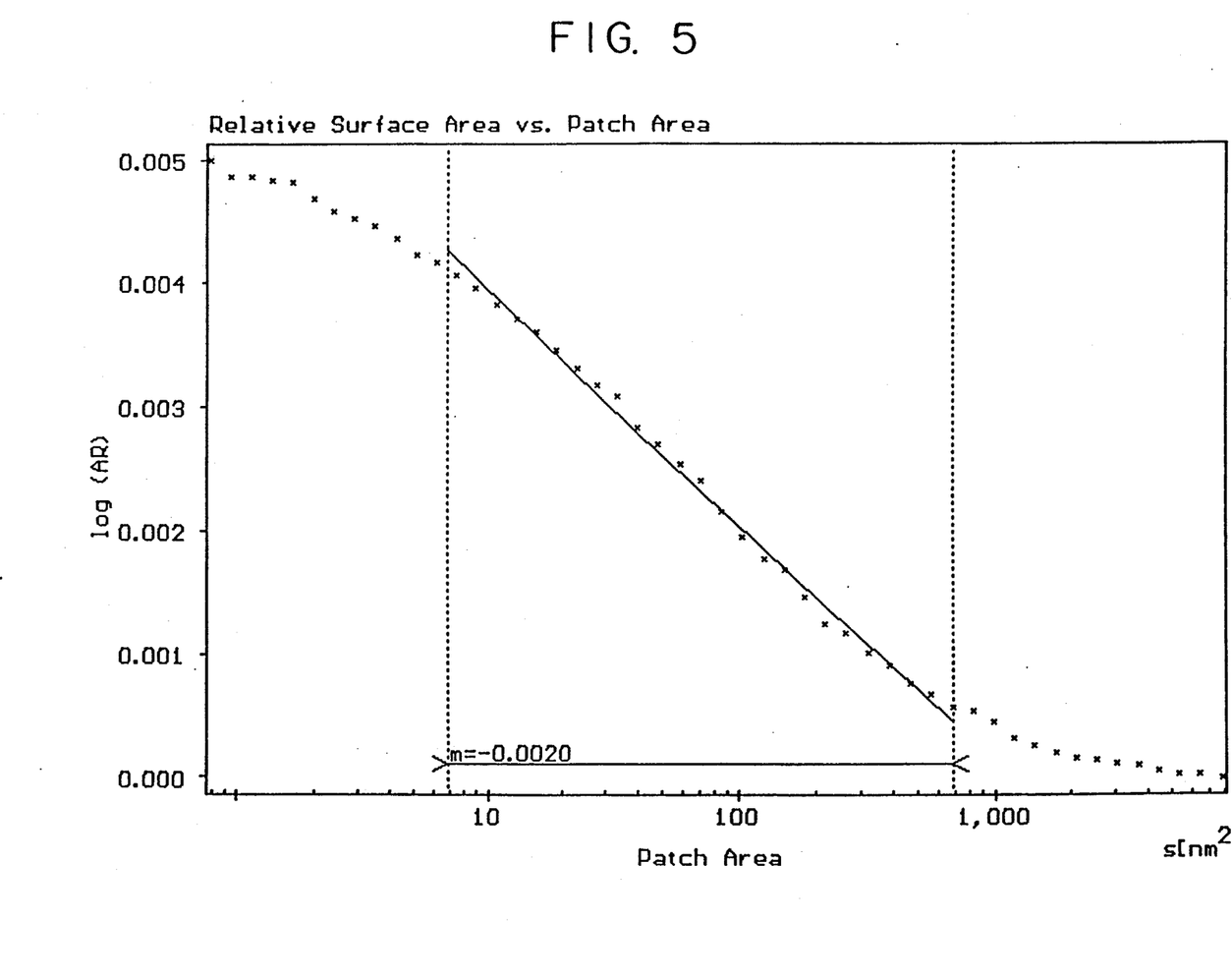
FIG. 5 is a log—log plot of relative area versus patch size for a plurality of patch area.

The log—log plot of AR versus patch area is shown in FIG. 5. The points represent the logs of the mean values of the relative areas for all sixteen 125×125 nm sections of the surface. The limits of the scatter at each patch area analyzed are also shown. The mean points were used in the regression analyses. The threshold is 819 nm². The line used to determine the slope (0.002) is shown to the limits of the region of regression analysis.

The slope of the log—log, AR-patch area plots is an indication of the complexity of the surface, or at what rate the intricacy, or roughness, of the surface increases with decreasing scale, at scales below the roughness threshold. Although determining the fractal dimension of the surface is not an objective of this invention, it can be estimated by adding two to the absolute value of the slope. In order to select the region over which the slope is determined, the highest regression coefficient is used. An alternate method would be to use the region over which the slope is the greatest. For the sorts of topographic data that have been encountered, both methods give similar slopes.

Both methods for determining the slope assume that the region of interest for determining the complexity of the surface, i.e., the region over which the surface is best described using fractal geometry, is bounded on the log—log plots. At large scales, the bound is the Euclidean behavior which gives AR values approaching 1. At fine scales, the bound may be the resolution of the measuring instrument or the digitized point spacing. No fine scale bound is noted on the STM data considered in this example.

The roughness threshold identifies the boundary between the scales of observation where the surface is most simply described by fractal geometry and where it is described by Euclidean geometry. At scales of interaction above the roughness threshold the surface appears smooth, at scales of interaction below the roughness threshold, the surface appears rough.

Surfaces are sometimes required to fulfill two functions, one of which depends on a smooth shape, best described by Euclidean geometry, another which depends on some roughness (e.g., anchoring a coating or providing friction) which is best described by fractal geometry. Manufacturing processes, which create surfaces, may also have two kinds of interaction which can be described similarly. Euclidean interactions would be based on gross tool geometry, such as the nose radius on the cutting tool during turning. Fractal interactions would be based on fine scale phenomena, such as the scratching of the surface by hard micro constituents in the workpiece which are dragged along with the tool for short distances. The threshold is a potentially useful concept to be used in designing surface topographies to fulfill Euclidean and fractal functions and in designing the manufacturing processes to create the desired surface topographies.

Figure 6:
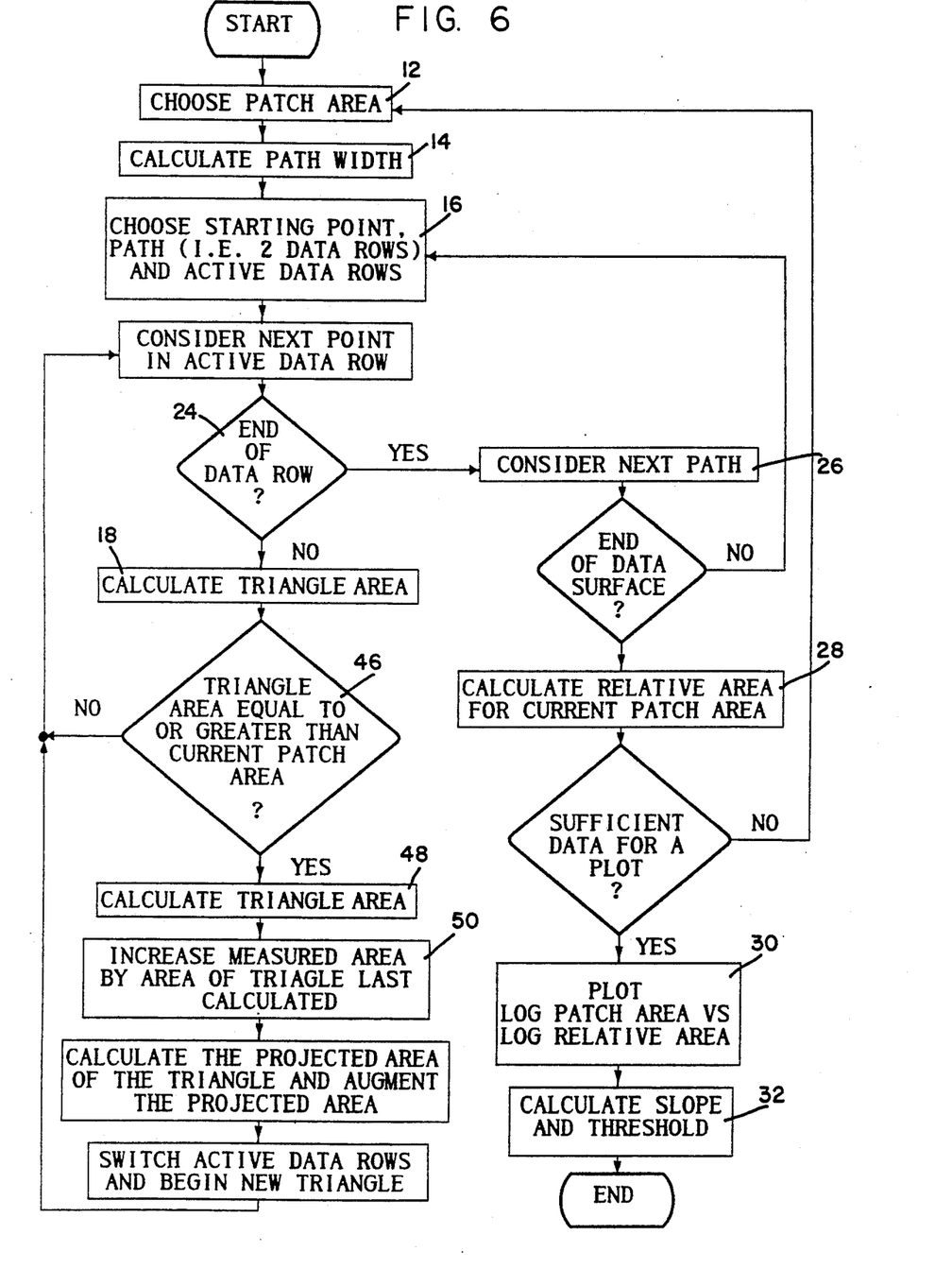
FIG. 6 is a flow chart which illustrates a first variation of the method of the present invention.
Figure 7:
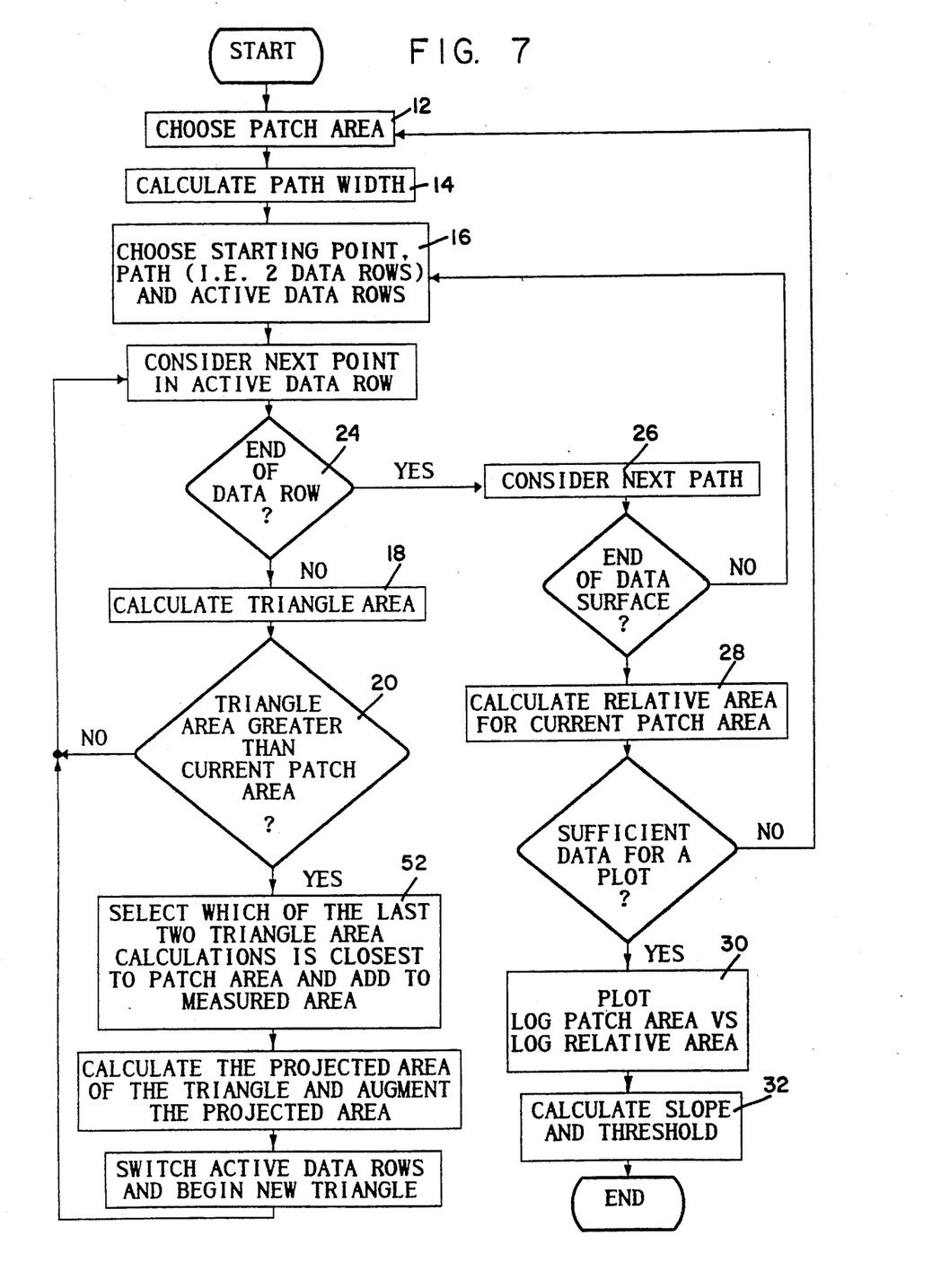
FIG. 7 is a flow chart which illustrates a second variation of the method of the present invention.

Referring to FIG. 6, there is illustrated a first variation of the method of the present invention. The method which is illustrated in FIG. 6 is similar to the method which is illustrated in FIG. 1. The blocks which represent the same steps in both methods are identified with the same reference numerals. The steps which are represented by the blocks 20, 22, and 23 in FIG. 1 are replaced by the steps which are represented by the blocks 46, 48, and 50 in FIG. 6. Instead of interpolating a theoretical point between the last two data points considered for each triangle, the third point of each new triangle utilizes the data point which yields a triangle area equal to or greater than the current patch area, as indicated by block 46. The area of this new triangle is then calculated, as indicated by block 48, and the area of the triangle last calculated is added to the measured area, as indicated by block 50. HG 7 represents a second variation of the method of the present invention which is similar to the variations illustrated in FIGS. 1 and 6. The only difference between the methods illustrated by FIGS. 1 and 7 is that instead of interpolating between the last two data points, as indicated by block 22, and increasing the measured area by the area of one current patch area as indicated by block 23 in FIG. 1, the data point which yields a triangle that is closest to the patch area is selected, as indicated in block 52. This calculated area is then added to the measured area, also indicated by block 52.

Figure 8:
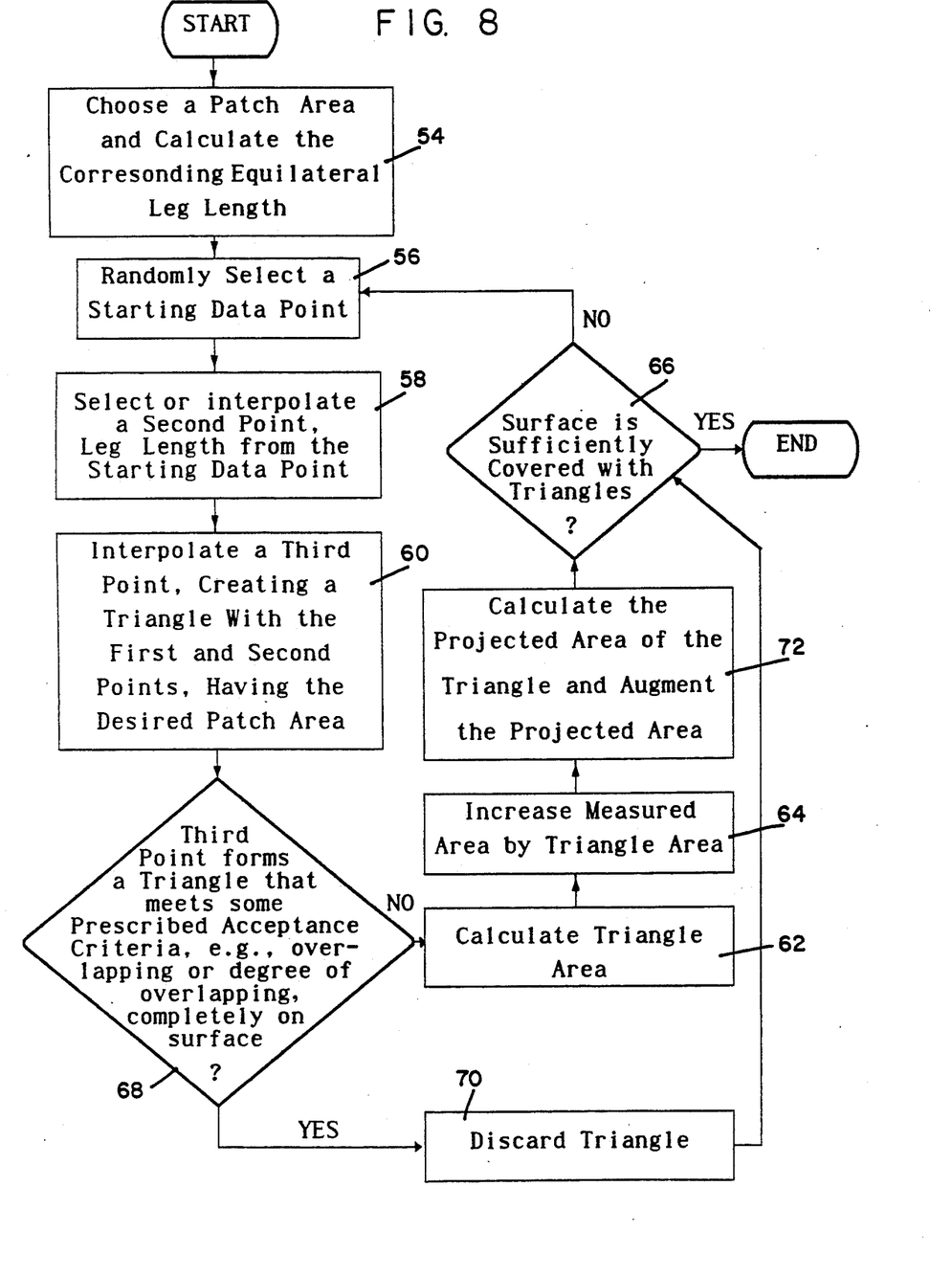
FIG. 8 is a flow chart which illustrates a third variation of the method of the present invention.

The method which is illustrated in FIG. 8 begins with the choosing of a patch area and the calculation of the leg length of an equilateral triangle having an area equal to the patch area, as indicated in block 54. A starting data point is randomly selected, as indicated in block 56. A second point, one equal lateral leg length from the starting data point, is then selected, as indicated in block 58. This second point is a theoretical point which may be at a particular data point or somewhere between two data points. A third point is interpolated to create a triangle with the first and second points which has the desired patch area, as indicated by block 60. The area of the triangle is calculated, as indicated by block 62. This calculated area is added to the measured area as indicated by block 64. The projected area of the triangle is also calculated and added to the total projected area as indicated by blocks 66. Additional triangles are generated sequentially at random location, in accordance with this method, until the surface is sufficiently covered with triangles, as indicated by blocks 66. If the vertices of a projected triangle lie in the projected area of any existing triangle, or if some other criteria for acceptability are violated, as indicated in blocks 68, the triangle is discarded, as indicated in block 70. The projected area of each triangle is calculated and added to the total projected area, as indicated by block 72.

Figure 9:
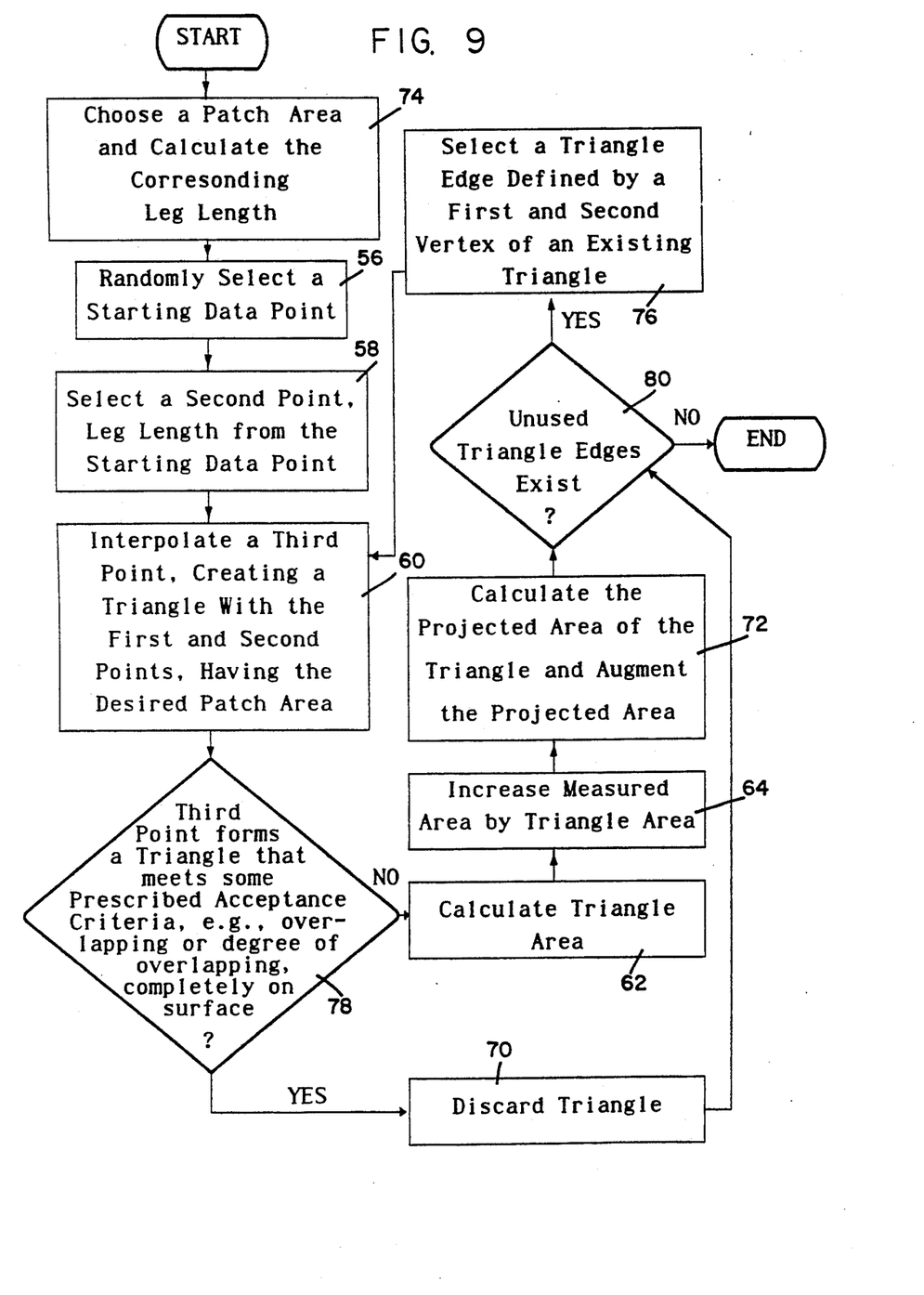
FIG. 9 is a flow chart which illustrates a fourth variation of the method of the present invention.

The method which is illustrated in FIG. 9 is similar to that which is illustrated in FIG. 8 and the blocks which identify the steps in both FIGS. 8 and 9, are identified with the same reference numerals. In the method which is illustrated in FIG. 9, the starting leg length is not necessarily that of an equilateral triangle having an area equal to the patch area. Instead, a specific leg length is selected as, indicated by block 74. A starting data point is randomly selected as indicated by block 56. A second point which is one leg length from the starting data point is selected, as indicated by block 58. A third point is interpolated to create a triangle with the first and second points having the desired patch area, as indicated by block 60. Additional triangles are generated from the triangle edge of the first and any subsequent triangles as indicated by block 76. If the third point of a new triangle does not generate an acceptable triangle based on some criteria, for example, if the new triangle lies in the projected area of any existing triangles as indicated by blocks 78, the triangle will be discarded as indicated by block 70. Triangles are generated until there are no more unused triangle edges which would yield an acceptable triangle within the data surface grid, as indicated by block 80.

Figure 10:
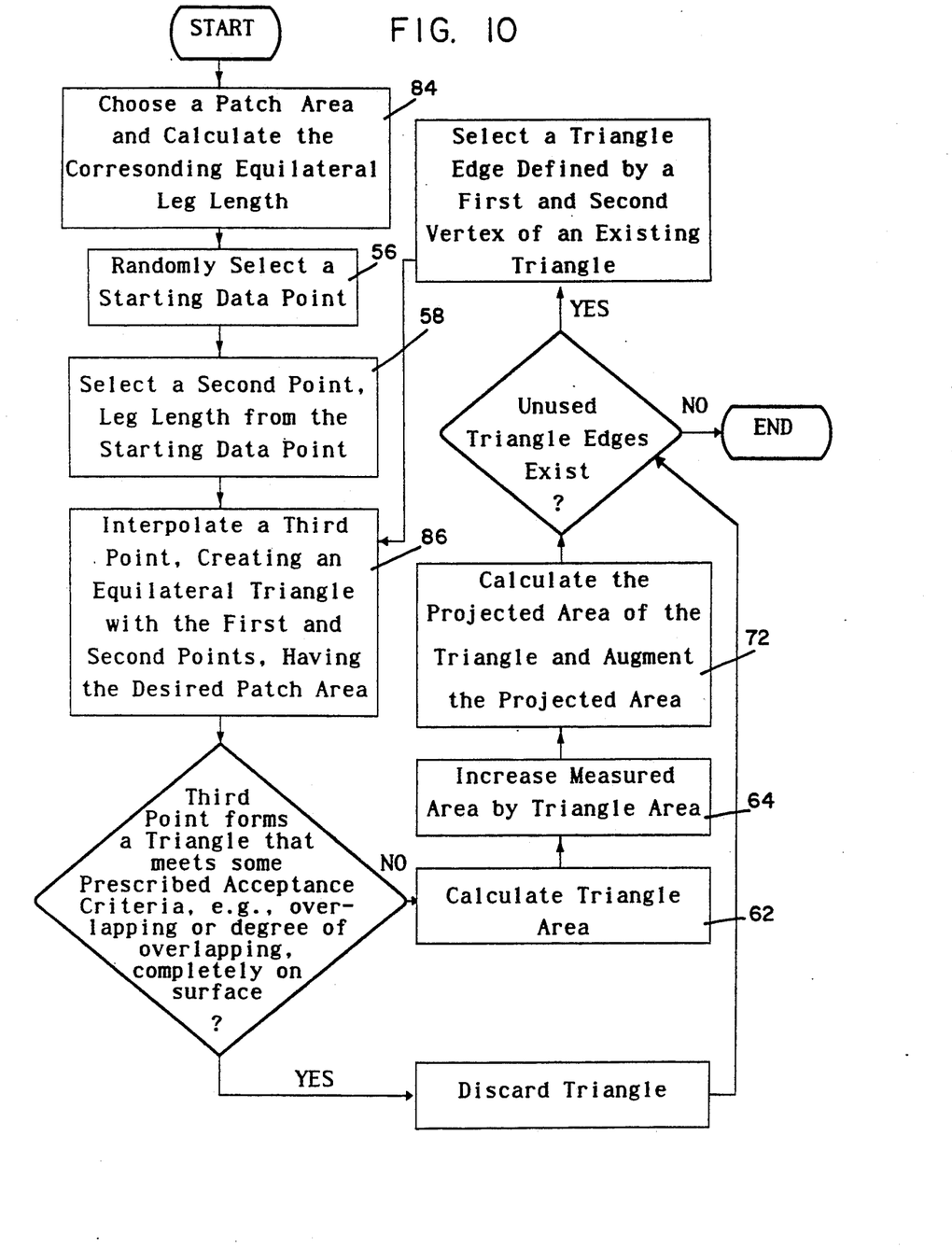
FIG. 10 is a flow chart which illustrates a fifth variation of the method of the present invention.

The method which is illustrated in FIG. 10 is identical to the method illustrated in FIG. 9 in every respect except that the leg length which is first selected for a triangular patch area is that of an equilateral triangle, as indicated in block 84. The first and subsequent triangles which are generated are equilateral triangles as indicated in block 86. All of the other steps in the method of FIG. 10 are identical with the steps of a method of FIG. 9.

Clearly, minor changes may be made in the method of the invention without departing from the material spirit thereof. It is not, however, desired to confine the invention to the exact method shown and described, but it is desired to include all such as properly come within the scope claimed.

The invention having been thus described, what is claimed as new and desired to secure by Letters Patent is:

1. A method of quantifying the topographic structure of a specimen surface having a first horizontal dimension which is parallel with a horizontal X axis, a second horizontal dimension which is parallel to a horizontal Y axis and which is transverse to said X axis, and a variable vertical dimension which is parallel to a vertical Z axis, said method comprising:
  (a) obtaining vertical height data for each point of a grid network of data points on said surface, said points being arranged in rows which are parallel to the X axis, said rows being spaced along the Y axis, (b) selecting a patch area value, (c) defining substantially the entire surface of said specimen surface with planar triangles which have an area substantially equal to said patch area value by using said data points as reference points for determining the positions of the three vertices of each triangle within said grid network of data points, (d) calculating the total area of said planar triangles to obtain a measured area value, (e) calculating the area of said specimen surface in the X-Y plane which is defined by said triangles to obtain a projected area value, (f) dividing said measured area value by said projected area value to obtain a relative area value, (g) repeating steps (b) through (f) for a plurality of patch area values to obtain a plurality of relative area value, and (h) plotting said plurality of relative area values to obtain a slope value and a threshold value which is defined as the point where the relative area value departs significantly from the slope value.

2. A method of quantifying the topographic structure of a specimen surface as recited in claim 1, wherein each vertex of each triangle is located at one of said data points.

3. A method of quantifying the topographic structure of a specimen surface as recited in claim 1, wherein the vertical height data for each point is obtained by the use of electronic profilometry apparatus which produces electronic signals which are indicative of the vertical height for each point, wherein said height data is transmitted to the memory file of a computer, and wherein all of the mathematical calculations to obtain said relative area values are performed by said computer.

4. A method of quantifying the topographic structure of a specimen surface as recited in claim 1, wherein said triangles are equilateral triangles.

5. A method of quantifying the topographic structure of a specimen surface having a first horizontal dimension which is parallel to a horizontal X axis, a second horizontal dimension which is parallel to a horizontal Y axis which is transverse to said X axis and a variable vertical dimension which is parallel to a vertical Z axis, said method comprising:

(a) obtaining vertical height data for each point of a grid network of data points on said surface, said points being arranged in rows which extend parallel to the X axis, said rows being spaced along the Y axis, (b) selecting a patch area value, (c) selecting a first row of said data points as a first active data row, (d) selecting a second row of said data points as a second active data row, (e) selecting a first starting data point in said first active data row, (f) selecting a second starting data point in said second active data row, (g) selecting a third data point in one of said active data rows which defines with said first and second starting points a first planar triangle which has an area which is substantially equal to said patch area value, (h) calculating the area of said triangle, (i) selecting another third data point in one of said active data rows which defines with two of the points of said first planar triangle a second planar triangle which has an area which is substantially equal to said patch area value, (j) calculating the area of said second planar triangle, (k) selecting additional third data points from either of said first and second active data rows for successive triangles in accordance to steps (i) and (j) to define additional planar triangles, each of said additional planar triangles having an area which is substantially equal to said patch area value until the area between said first and second active rows is substantially defined by triangles having areas which are substantially equal to said patch area value, (l) selecting a third row of points from said grid network of points to interrelate with said second row of points so that said second and third rows of points are the first and second active data rows for defining successive triangles in accordance with steps (e) through (k), (m) selecting subsequent active data rows to interrelate with a previous active data row in accordance with steps (e) through (k) until substantially all of the topographic surface area of said specimen surface is defined by triangles having areas which are substantially equal to said patch area value, (n) adding the surface areas of each of said triangles to obtain a measured area value, (o) calculating the area of said specimen surface in the X-Y plane which is defined by said triangles to obtain a projected area value, (p) dividing said measured area value by said projected area value to obtain a relative area value, (q) repeating steps (b) through (p) for a plurality of patch area values to obtain a plurality of relative are values, and (r) plotting said plurality of relative area values to obtain a slope value and a threshold value which is defined as the point where the relative area value departs significantly from the slope value.

6. A method of quantifying the topographic structure of a specimen surface as recited in claim 5, wherein the third point of successive triangles between two active data rows is selected alternately from the first and second active data rows.

7. A method of quantifying the topographic structure of a specimen surface as recited in claim 5, wherein the vertical height data for each point is obtained by the use of electronic profilometry apparatus which produces electronic signals which are indicative of the vertical height data for each point, wherein said height data is transmitted to the memory file of a computer, and wherein all of the mathematical calculations to obtain said relative area values are performed by said computer.

8. A method of quantifying the topographic structure of a specimen surface as recited in claim 5, wherein each additional third data point represents the data point which will define a triangle which has an area which is closest to the patch area value.

9. A method of quantifying the topographic structure of a specimen surface as recited in claim 5, wherein each additional third data point represents the closest data point to the last defined triangle which will define a triangle which has a area which is at least equal to the patch area value.

10. A method of quantifying the topographic structure of a specimen surface having a first horizontal dimension which is parallel to a horizontal X axis, a second horizontal dimension which is parallel to a horizontal Y axis which is transverse to said X axis and a variable vertical dimension which is parallel to a vertical Z axis, said method comprising:

(a) obtaining vertical height data for each point of a grid network of points on said surface, said points being arranged in rows which extend parallel with the X axis, said rows being spaced along the Y axis, (b) selecting a patch area value, (c) selecting a first row of said points as a first active data row, (d) selecting a second row of said points as a second active data row, (e) selecting a first starting point in said first active data row, (f) selecting a second starting point in said second active data row, (g) selecting a third point in one of said active rows which defines with said first and second points a preliminary planar triangle which has an area which is at least as great as said patch area value, (h) interpolating between said third point and the point in the same row immediately preceding said third point to find a theoretical point which defines with said first and second points a first active planar triangle which has an area which is equal to said patch area value, (i) selecting an additional point in one of said active data rows which defines with two of the points of said first active planar triangle a preliminary planar triangle which has an area which is at least as great as said patch area value, (j) interpolating between said additional point and the point in the same row immediately preceding said additional point to find a theoretical third point which defines with two of the points of said first planar triangle a second active planar triangle which has an area which is equal to said patch area value, (k) selecting additional third points from either of said first and second active data rows to define additional active planar triangles in accordance with steps (i) and (j), each of said additional active planar triangles having an area which is equal to said patch area value, (l) selecting a third row of points from said grid network of points to interrelate with said second row of points so that said second and third rows of points are the first and second active data rows for defining successive active planar triangles in accordance with steps (e) through (k), (m) selecting subsequent active data rows to interrelate with a previous active data row in accordance with steps (e) through (k) until substantially all of the topographic surface area of said specimen surface is defined by said active planar triangles, (n) adding the measured areas of said active planar triangles to obtain a total measured area value, (o) calculating the area of said specimen surface in the X-Y plane which is defined by said active planar triangles to obtain a total projected area value, (p) dividing said total measured area value by said total projected area value to obtain a relative area value, (q) repeating steps (b) through (p) for a plurality of patch area values to obtain a plurality of relative are values, and (r) plotting said plurality of relative area values to obtain a slope value and a threshold value which is defined as the point where the relative area value departs significantly from the slope value.

11. A method of quantifying the topographic structure of a specimen surface as recited in claim 10, wherein the third point of successive active planar triangles between two active data rows is selected alternately from the first and second active data rows.

12. A method of quantifying the topographic structure of a specimen surface as recited in claim 10, wherein the vertical height data for each point is obtained by the use of electronic profilometry apparatus which produces electronic signals which are indicative of the vertical height data of said points, wherein said vertical height data is transmitted to the memory file of a computer, and wherein all of the mathematical calculations to obtain said relative area values are performed by said computer.

13. A method of quantifying the topographic structure of a specimen surface having a first horizontal dimension which is parallel to a horizontal X axis, a second horizontal dimension which is parallel to a horizontal Y axis and which is transverse to said X axis, and a variable vertical dimension which is parallel to a vertical Z axis, said method comprising:

(a) obtaining vertical height data for each point of a grid network of data points on said surface, said data points being arranged in rows which are parallel to the X axis, said rows being spaced along the Y axis, (b) selecting a patch area value, (c) randomly selecting a first point from one of said data points, (d) selecting a second point from one of said data points, (e) interpolating a third point which defines with said first and second points a first planar triangle which has an area which is substantially equal to said patch area value, (f) calculating the area of said first planar triangle, (g) selecting two vertices of the said first planar triangle, (h) interpolating a third point which forms with the two vertices of said first planar triangle a second planar triangle which is substantially equal to the said patch area value, (i) calculating the area of said second planar triangle, (j) repeating steps (g) through (i) for all vertices of said first and second triangle and all subsequent triangles for defining subsequent triangles each of which:

(1) has an area which is substantially equal to said patch area value, (2) lies within the X and Y bounds of said grid network of data points, and (3) does not violate prescribed conditions for a valid triangle, (k) calculating the total area of said planar triangles to obtain a total measured area value, (l) calculating the area of said specimen surface in the X-Y plane which is defined by said triangles to obtain a total projected area value, (m) dividing said total measured area value by said total projected area value to obtain a measured area value, (n) repeating steps (b) through (m) for a plurality of patch area values to obtain a plurality of relative area values, and (o) plotting said plurality of relative area values to obtain a slope value and a threshold value which is defined as the point where the relative area value departs significantly from the slope value.

14. A method of quantifying the topographic structure of a specimen surface as recited in claim 13, wherein said planar triangles are equilateral triangles so that each leg of the triangle has a specific equilateral leg length and the third point of each triangle which is generated is obtained by interpolation using said data points as reference points.

* * * * *